US009683469B2

(12) United States Patent
Remingol

(10) Patent No.: US 9,683,469 B2
(45) Date of Patent: Jun. 20, 2017

(54) SYSTEM FOR TREATING THE EXHAUST GASES OF A MOTOR VEHICLE ENGINE AND METHOD FOR CONTROLLING SAME

(71) Applicant: Renault s.a.s., Boulogne Billancourt (FR)

(72) Inventor: Mickael Remingol, Ivry-sur-Seine (FR)

(73) Assignee: RENAULT s.a.s., Boulogne Billancourt (FR)

( * ) Notice: Subject to any disclaimer, the term of this patent is extended or adjusted under 35 U.S.C. 154(b) by 46 days.

(21) Appl. No.: 14/654,698

(22) PCT Filed: Dec. 19, 2013

(86) PCT No.: PCT/EP2013/077428
§ 371 (c)(1),
(2) Date: Jun. 22, 2015

(87) PCT Pub. No.: WO2014/111226
PCT Pub. Date: Jul. 24, 2014

(65) Prior Publication Data
US 2015/0354423 A1    Dec. 10, 2015

(30) Foreign Application Priority Data

Jan. 15, 2013  (FR) ..................................... 13 50344

(51) Int. Cl.
*F01N 3/00* (2006.01)
*F01N 3/023* (2006.01)
(Continued)

(52) U.S. Cl.
CPC ........... *F01N 3/0234* (2013.01); *F01N 3/029* (2013.01); *F01N 9/002* (2013.01); *F01N 9/005* (2013.01);
(Continued)

(58) Field of Classification Search
CPC ..... F01N 2900/1404; F01N 2900/1606; F01N 9/002; F01N 9/005; F02D 2200/0812; F02D 41/029; F02D 41/1446; F02D 41/1454
(Continued)

(56) References Cited

U.S. PATENT DOCUMENTS 5,287,698 A * 2/1994 Shinzawa ............... F01N 3/027
60/285
6,983,591 B2 * 1/2006 Kondo ............... B01D 46/0063
60/274

(Continued)

FOREIGN PATENT DOCUMENTS

FR    2 864 992 A1    7/2005
FR    2 897 648 A1    8/2007
(Continued)

OTHER PUBLICATIONS

International Search Report Issued Feb. 18, 2014 in PCT/EP13/077428 Filed Dec. 19, 2013.
(Continued)

*Primary Examiner* — Jesse Bogue
(74) *Attorney, Agent, or Firm* — Oblon, McClelland, Maier & Neustadt, L.L.P.

(57) ABSTRACT

A system for treating exhaust gases of an engine on a motor vehicle including a particle filter, in which regeneration of the particle filter is controlled by bringing temperature of gases that are upstream from the particle filter to a first set temperature to initiate combustion of soot accumulated in the particle filter. A critical area and a normal area are defined on the basis of a point of operation of the engine, by a load of the engine and a speed. The temperature of the exhaust gases is brought to the first set temperature in the
(Continued)

normal area and to a second set temperature, which is lower than the first set temperature, in the critical area.

8 Claims, 2 Drawing Sheets

(51) Int. Cl.
*F01N 3/029* (2006.01)
*F02D 41/02* (2006.01)
*F01N 9/00* (2006.01)
*F02D 41/14* (2006.01)
*F01N 3/10* (2006.01)

(52) U.S. Cl.
CPC ....... *F02D 41/029* (2013.01); *F02D 41/0245* (2013.01); *F01N 3/103* (2013.01); *F01N 2430/08* (2013.01); *F01N 2430/085* (2013.01); *F01N 2560/06* (2013.01); *F01N 2900/0412* (2013.01); *F01N 2900/0416* (2013.01); *F01N 2900/0601* (2013.01); *F01N 2900/12* (2013.01); *F01N 2900/1404* (2013.01); *F01N 2900/1606* (2013.01); *F02D 41/1446* (2013.01); *F02D 41/1454* (2013.01); *F02D 2200/0812* (2013.01); *Y02T 10/26* (2013.01); *Y02T 10/47* (2013.01)

(58) Field of Classification Search
USPC .................................................. 60/274–324
See application file for complete search history.

(56) References Cited

U.S. PATENT DOCUMENTS

| | | | |
|---|---|---|---|
| 8,215,294 B2* | 7/2012 | Tan ........................ | F01N 3/103 123/681 |
| 8,522,532 B2* | 9/2013 | Yamada ............. | B01D 46/0063 60/285 |
| 2004/0139733 A1* | 7/2004 | Koga .................... | F02D 41/029 60/280 |
| 2005/0150212 A1 | 7/2005 | Pfaeffle et al. | |
| 2005/0204731 A1* | 9/2005 | Nakano ............... | F02D 41/0245 60/295 |
| 2005/0247052 A1* | 11/2005 | Kobayashi ............ | F01N 13/009 60/297 |
| 2006/0096280 A1* | 5/2006 | Zhan ...................... | F01N 9/002 60/297 |
| 2006/0130468 A1 | 6/2006 | Sun et al. | |
| 2009/0151337 A1* | 6/2009 | Tornambe ............. | F01N 3/0238 60/295 |
| 2009/0217647 A1 | 9/2009 | Daneau | |
| 2010/0313551 A1* | 12/2010 | Johnson ................. | F01N 3/023 60/286 |

FOREIGN PATENT DOCUMENTS

| | | |
|---|---|---|
| FR | 2 931 876 A1 | 12/2009 |
| GB | 2 421 544 A | 6/2006 |

OTHER PUBLICATIONS

French Search Report Issued Sep. 25, 2013 in French Application No. 1350344 Filed Jan. 15, 2013.

* cited by examiner

SYSTEM FOR TREATING THE EXHAUST GASES OF A MOTOR VEHICLE ENGINE AND METHOD FOR CONTROLLING SAME

TECHNICAL FIELD

The present invention relates to a method for controlling a system for treating the exhaust gases of a motor vehicle engine, in particular the regeneration phases of a particle filter. The invention also relates to the exhaust gas treatment system implementing this method.

PRIOR ART

In order to regenerate a particle filter of an internal combustion engine, i.e. in order to clean the filter of the soot produced from the exhaust gases of the engine and accumulated in the filter during normal operation of the engine, the soot is subjected to oxidation reactions in the presence of oxygen and under conditions in which thermal energy is applied. Nowadays, in a motor vehicle diesel engine, the temperature upstream of the particle filter, in order to initiate the regeneration thereof, is approximately 650° C.

The soot is burned by fuel, which can be injected either directly at the exhaust of the engine upstream of the particle filter or into the cylinders of the engine late in the expansion phase of the combustion cycle so as not to be burned in the cylinder and so as to be discharged at the exhaust.

The elevated temperature, greater than 650° C., upstream of the particle filter may also be obtained by reducing the yield of the combustion reaction in the cylinders so as to increase the thermal losses thereof, for example by injecting later into the cylinders the fuel involved in the combustion, i.e. the fuel that actually burns in order to produce the engine torque.

Document FR 2 862 100-A1 shows an example of fuel injection into the combustion chambers at the end of the cycle. These techniques make it possible to supplement the temperature rise of the exhaust gases at the outlet of the engine, irrespective of the running conditions and/or operating conditions of the engine, so as to ensure good regeneration efficacy.

Due to the fact that a diesel engine operates generally with oxygen excess, the presence of oxygen is assured. It should be noted that the more oxygen there is in the exhaust gases, the quicker is the combustion of the soot. The oxidation reactions of the soot are exothermic, which makes it possible to maintain the oxidation reactions during regeneration. In a medium in which the amount of oxygen is high, this may induce a sort of chain reaction referred to as runaway. The combustion of the soot maintains itself and the temperature in the particle filter rises very quickly up to temperatures that may induce the degradation of the filter, for example temperatures in excess of 1000° C.

There are particular speed/load operating points of the engine at which the conditions are close to runaway. When the engine is at low load, the amount of oxygen consumed by the combustion in the cylinder is low, thus leaving a large amount of oxygen available for the combustion of the soot. Typically, when the engine is not driving the vehicle, the conditions are close to runaway. Another critical case presents itself during a release of the accelerator pedal, while the vehicle is started and drives the engine.

A first known method for avoiding the runaway lies in limiting the amount of oxygen available in the exhaust gases. For this, the amount of air that the engine sucks in during the intake phase is restricted with the aid of a valve or a flap. Alternatively or in addition, the admitted fresh air is substituted for the exhaust gases originating from the engine by controlling a gas recirculation valve. However, this method has the disadvantage of restricting the amount of oxygen necessary for the combustion in the cylinder of the diesel engine, which increases the risk of combustion instabilities or misfires.

A second method lies in increasing the load of the engine at these operating points so that the internal combustion engine consumes more oxygen. It is then possible to control the charge of a battery or the power of an air-conditioning system or of a brake. Document FR 2 919 665 A1 shows an exemplary embodiment of a system that uses an electrical accumulator charging system to control the temperature of the exhaust gases during a regeneration phase. This method is limited in that the absorption power is generally limited, either in terms of intensity or in terms of duration.

A third known method lies in lowering the temperature of initiation of the regeneration. This method is limited in that the temperature drop also lowers the efficacy of regeneration in the phases not affected by the runaway risks.

A fourth method lies in limiting the amount of soot in the particle filter so as to avoid reaching a mass that is too critical with regard to a runaway. This solution imposes more frequent regenerations and on the whole leads to an overconsumption of fuel.

The invention aims to propose a method and a system for treating exhaust gases with a particle filter for a motor vehicle that can prevent the risks of runaway of the regeneration of the particle filter.

DESCRIPTION OF THE INVENTION

The invention aims to overcome the various disadvantages of the known control methods. With these objectives in mind, the invention relates to a method for controlling a system for treating the exhaust gases of a motor vehicle engine, the gas treatment system comprising a particle filter, in which method a regeneration of the particle filter is controlled by bringing the temperature of the gases upstream of the particle filter to a first set temperature in order to initiate a combustion of the soot accumulated in the particle filter, characterized in that a critical area and a normal area are defined on the basis of the operating point of the engine, characterized by a load of the engine and a speed, and the temperature of the exhaust gases is brought to the first set temperature in the normal area and to a second set temperature, which is lower than the first set temperature, in the critical area.

The study of the operating conditions of the engine and of the exhaust gas treatment system makes it possible to determine the conditions under which the runaway risks are present. It is noted that the predominant parameters are engine speed, i.e. the speed of rotation of the crankshaft, and the load of the engine, i.e. the torque provided. Depending on these parameters, it is possible to limit the critical area, which is found at low loads and low speeds, and to apply in this area a lower set temperature at the inlet of the particle filter so as to remove the runaway risks. Beyond the critical area, the efficacy of the regeneration is preserved at the maximum level thereof.

In accordance with an improvement, a safety area is also defined between the critical area and the normal area, and the exhaust gases are brought to a third, intermediate set temperature between the first and the second set temperature. An intermediate area is thus created, which makes it possible to strictly limit the size of the critical area and in which the constraint on the temperature is less severe.

In a complementary manner, the third set temperature is dependent on the level of loading of the particle filter. The risk of runaway is also dependent on the level of loading of the particle filter. In particular, the risk is low when the level of loading of the particle filter with soot is low. In this case it is possible to again raise the temperature level in the safety area.

Alternatively, the third set temperature is a linear interpolation between the second and the first set temperature, depending on the speed difference between the critical area and the normal area for the load of the current speed/load operating point of the engine. The variation of the third setpoint is thus progressive on the basis of the distance from the current operating point to the critical area.

In accordance with another improvement, the second set temperature is dependent on an oxygen level evaluated in the exhaust gases upstream of the particle filter. When the oxygen level is higher, the speed of combustion of the soot is greater, and therefore the risk of runaway is increased. By taking into account the oxygen level and by adjusting the inlet temperature of the gases as a result, the risk of runaway in the critical area is removed more justly. The oxygen level may change depending on the conditions outside the vehicle, for example depending on the atmospheric pressure, the altitude at which the vehicle is located, or the temperature of the ambient air. The oxygen level in the exhaust gases is a good indication of these parameters.

Similarly, the third set temperature is dependent on a level of oxygen evaluated in the exhaust gases upstream of the particle filter. As before, the set temperature in the safety area can be adjusted whilst ensuring the absence of a risk of runaway.

The invention also relates to a system for treating the exhaust gases of a motor vehicle engine, the system comprising a particle filter, thermal means for managing the temperature of the exhaust gases upstream of the particle filter, and a control unit for controlling the thermal means, the control unit being set up to manage the thermal means so as to control a regeneration of the particle filter by bringing the temperature of the exhaust gases upstream of the particle filter to a first set temperature, characterized in that the control unit is set up to define a critical area and a normal area on the basis of the operating point of the engine, characterized by a load of the engine and a speed, and to bring the temperature of the exhaust gases to the first set temperature in the normal area and to a second set temperature, which is lower than the first set temperature, in the critical area.

BRIEF DESCRIPTION OF THE FIGURES

The invention will be better understood and further features and advantages will emerge upon reading the following description, this being provided with reference to the accompanying drawings, in which.

DETAILED DESCRIPTION

Figure 1:
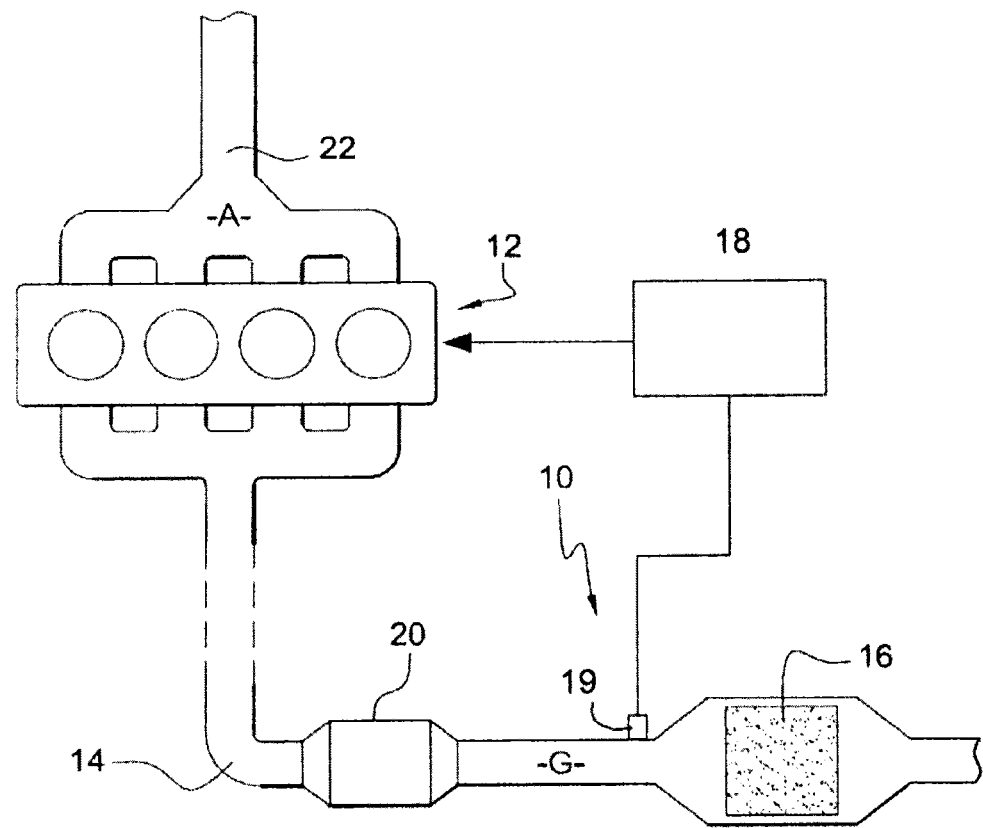
FIG. 1 shows a system for treating exhaust gases according to the invention.

FIG. 1 shows a motorization system 1 comprising an internal combustion engine 12 and a system for treating 10 the exhaust gases of the engine 12. The engine is a diesel engine, for example. An exhaust line 14 makes it possible to discharge the gases G of the engine 12 into the atmosphere. The treatment system 10 is installed in the exhaust line 14 and comprises an oxidation catalyst 20 upstream of a particle filter 16. The motorization system also comprises an intake manifold 22 for distributing the intake air A to the different cylinders of the engine 12.

The exhaust gases G produced by the engine 12 are discharged into the exhaust line 14. As these gases pass into the oxidation catalytic converter 20, the unburned gases contained in the exhaust gases G, such as hydrocarbons and carbon monoxide, are oxidized in an exothermic reaction. Then, as these gases pass into the particle filter 16, the particles of soot contained in the exhaust gases are retained by the filter in the normal operating mode of the engine (i.e.: outside a regeneration phase of the filter 16).

The treatment system 10 further comprises a control unit 18, which receives information regarding the temperature measured in the exhaust line 14 by the sensor 19 upstream of the particle filter 16. The control unit 18 also makes it possible to manage the engine 12 so as to manage the temperature of the exhaust gases G upstream of the particle filter 16 under certain circumstances.

Periodically, the particles thus trapped in the particle filter 16 are burned during a phase of regeneration. This regeneration, in order to take place, requires the filter to reach a temperature greater than or equal to the combustion temperature of the particles. The particle filter 16 is heated by the exhaust gases G.

When it is desired to regenerate the particle filter 16, the control unit 18 modifies, for example, the injection conditions so as to lower the yield of the combustion in the cylinders and thus increase the temperature of the exhaust gases G. It is then sought to obtain a set temperature of the exhaust gases G upstream of the particle filter 16.

For example, the combustion yield can be lowered by delaying the injection of the fuel in the cylinders of the engine during the cycle.

Figure 2:
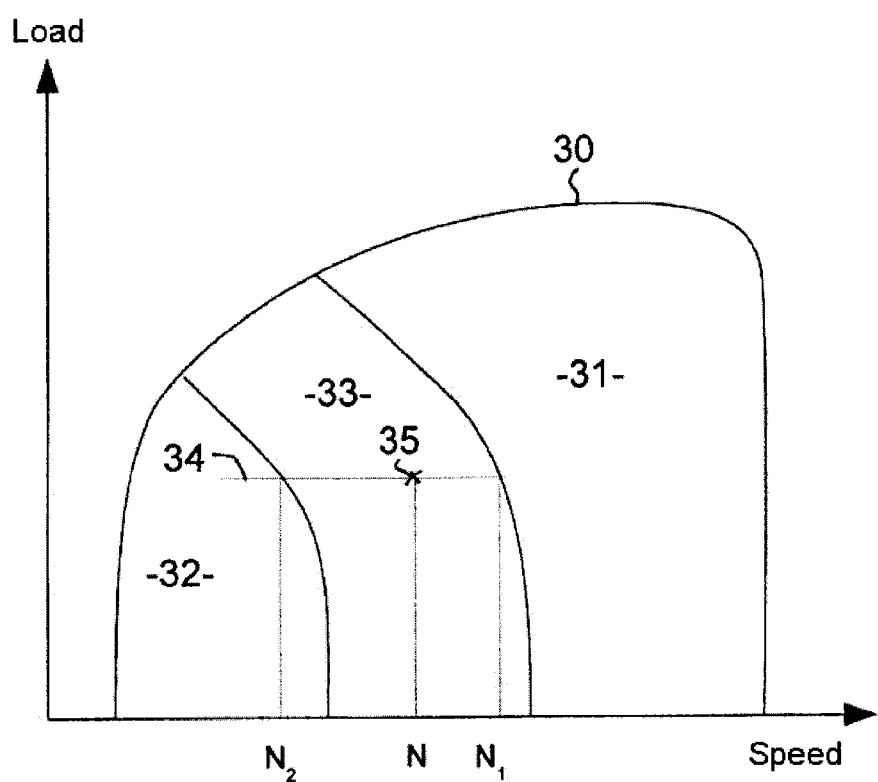
FIG. 2 is a graph showing the different operating areas of the engine delimited in accordance with the invention

The graph of FIG. 2 shows operating areas of the engine 12, with the speed of the engine 12 plotted on the abscissa and the torque delivered by the engine 12 at the crankshaft plotted on the ordinate. A limit curve 30 represents the maximum torque delivered by the engine 12 as a function of speed.

Below the limit curve 30, three areas are shown: a normal area 31, on the side of the maximum speed; a critical area 32, on the side of the lowest speeds, and an intermediate safety area 33 between the normal area 31 and the critical area 32.

In accordance with the invention the temperature of the gases upstream of the particle filter 16 is brought to a first set temperature T1 in the normal area 31, to a second set temperature T2, which is lower than the first temperature, in the critical area 32, and to a third set temperature T3, which is an intermediate temperature between the first and the second set temperature T2, in the safety area 33. The first set temperature T1 is, for example, 650° C. The second set temperature T2 may be determined in a fixed manner, once tests have been performed to check that there is no risk of runaway. The third set temperature T3 may also be predetermined at a fixed value, which is an intermediate value between the first and the second set temperature T2. During the regeneration phase, the control unit 18 determines the area in which the engine 12 is operating and applies the corresponding set temperature by controlling this temperature with the aid of the temperature probe 19 upstream of the particle filter 16, for example by providing a controller of the PID type.

In a particular embodiment the control unit 18 also receives information regarding the loading of the particle filter 16, i.e. the mass of soot stored in the filter 16. This information for example comes from a measurement of the difference in pressure between the areas upstream and downstream of the particle filter 16, in a manner known per se. The control unit 18 adapts the third set temperature T3 depending on the level of loading of the particle filter 16, i.e. depending on the loading of the filter 16 divided by the maximum storage capacity thereof. Thus, the third set temperature T3 is equal to the first set temperature T1 when the level of loading of the particle filter 16 is zero or close thereto, and equal to the second set temperature T2 when the level of loading of the particle filter 16 is at the permitted limit. The third set temperature T3 is interpolated between these two values T1, T2 depending on the level of loading of the particle filter 16.

In accordance with a further embodiment of the invention the system comprises means for evaluating the oxygen level in the exhaust gases G. These means may be an oxygen probe directly measuring the oxygen level, or the control unit 18 set up to calculate this oxygen level on the basis of the measured or controlled environmental parameters and operation parameters of the engine 12. In this embodiment the control unit 18 determines the second set temperature T2 on the basis of the evaluated oxygen level in the exhaust gases G upstream of the particle filter 16.

By way of example, the second set temperature T2 is determined as follows:

- if the oxygen level is above a first predetermined threshold, the second set temperature T2 is fixed at a low limit T2min;
- if the oxygen level is below a second predetermined threshold, below the first threshold, the second set temperature T2 is fixed at a high limit T2max;
- if the oxygen level is between the first threshold T2min and the second threshold T2max, the second set temperature T2 is calculated by linear interpolation between the low limit T2min and the high limit T2max on the basis of the variation of the oxygen level between the first and the second threshold.

Similarly, implemented at the same time as for the second set temperature T2, the third set temperature T3 is dependent on the oxygen level evaluated in the exhaust gases G upstream of the particle filter 16. For example, in the calculation of the third set temperature T3 on the basis of the level of loading of the particle filter 16, the second set temperature T2 calculated as explained above on the basis of the oxygen level is taken into consideration.

In accordance with another embodiment the third set temperature T3 is a linear interpolation between the second set temperature T2 and the first set temperature T1, depending on the speed difference between the critical area 32 and the normal area 31 for the load of the current operating point of the engine 12. With reference to FIG. 2, a horizontal line 34 from the current operating point 35 in the safety area 33 intersects the delimitations of the critical area 32 and of the normal area 31 at the abscissas $N_2$ and $N_1$ respectively. For this current operating point 35, the third set temperature T3 is calculated by linear interpolation between the second and the third set temperature T2, T3 in accordance with the formula:

$$T_3 = T_2 + \frac{T_1 - T_2}{N_1 - N_2}(N - N_2)$$

The invention is not limited to the embodiments that have just been described by way of example. The temperature upstream of the particle filter 16 can be evaluated on the basis of other measurements and with mathematic models implemented by the control unit 18 or by other computers installed in the vehicle. The control unit 18 is presented as being independent, but the functions of said control unit can be implemented by a computer also performing other functions, such as the control of the engine 12.

The invention claimed is:

1. A method for controlling a system for treating exhaust gases of a motor vehicle engine, the gas treatment system comprising a particle filter, the method comprising:
   controlling a regeneration of the particle filter by bringing a temperature of gases upstream of the particle filter to a set temperature to initiate a combustion of soot accumulated in the particle filter,
   designating a critical area and a normal area on a graph of speed versus load of the engine such that an operating point of the engine corresponds to a given speed and a given load on the graph,
   bringing the temperature of the exhaust gases to a first set temperature when the operating point is in the normal area and to a second set temperature, which is lower than the first set temperature, when the operating point is in the critical area, and
   evaluating an oxygen level in the exhaust gases upstream of the particle filter,
   wherein the second set temperature is dependent on the oxygen level evaluated in the exhaust gases upstream of the particle filter.

2. The method as claimed in claim 1, wherein a safety area is defined between the critical area and the normal area on the graph, and the method further comprising bringing the exhaust gases to a third set temperature which is intermediate between the first and the second set temperature.

3. The method as claimed in claim 2, wherein the third set temperature is dependent on a level of loading of the particle filter.

4. The method as claimed in claim 2, wherein the third set temperature is a linear interpolation between the second and the first set temperature, depending on speed difference between the critical area and the normal area for a load of the current operating point of the engine.

5. The method as claimed in claim 2, further comprising evaluating an oxygen level in the exhaust gases upstream of the particle filter, and wherein the third set temperature is dependent on the oxygen level evaluated in the exhaust gases upstream of the particle filter.

6. The method as claimed in claim 1, wherein, the speed is higher in the normal area than the critical area for an equal value of the load.

7. A method for controlling a system for treating exhaust gases of a motor vehicle engine, the gas treatment system comprising a particle filter, the method comprising:
   controlling a regeneration of the particle filter by bringing a temperature of gases upstream of the particle filter to a set temperature to initiate a combustion of soot accumulated in the particle filter,
   designating a critical area and a normal area on a graph of speed versus load of the engine such that an operating point of the engine corresponds to a given speed and a given load on the graph, and
   bringing the temperature of the exhaust gases to a first set temperature when the operating point is in the normal area and to a second set temperature, which is lower than the first set temperature, when the operating point is in the critical area,
wherein a safety area is defined between the critical area and the normal area on the graph, and the method further comprising bringing the exhaust gases to a third set temperature which is intermediate between the first and the second set temperature, and
wherein the third set temperature is dependent on a level of loading of the particle filter.

8. A method for controlling a system for treating exhaust gases of a motor vehicle engine, the gas treatment system comprising a particle filter, the method comprising:
controlling a regeneration of the particle filter by bringing a temperature of gases upstream of the particle filter to a set temperature to initiate a combustion of soot accumulated in the particle filter,
designating a critical area and a normal area on a graph of speed versus load of the engine such that an operating point of the engine corresponds to a given speed and a given load on the graph, and
bringing the temperature of the exhaust gases to a first set temperature when the operating point is in the normal area and to a second set temperature, which is lower than the first set temperature, when the operating point is in the critical area,
wherein a safety area is defined between the critical area and the normal area on the graph, and the method further comprising bringing the exhaust gases to a third set temperature which is intermediate between the first and the second set temperature, and
wherein the third set temperature is a linear interpolation between the second and the first set temperature, depending on speed difference between the critical area and the normal area for a load of the current operating point of the engine.

* * * * *